(12) United States Patent
Rosenthal et al.

(10) Patent No.: US 6,311,192 B1
(45) Date of Patent: Oct. 30, 2001

(54) METHOD FOR INITIATING WORKFLOWS IN AN AUTOMATED ORGANIZATION MANAGEMENT SYSTEM

(75) Inventors: Kathryn A. Rosenthal, Plano, TX (US); Sebastien Cvilic, Brussels (BE)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 09/213,622

(22) Filed: Dec. 17, 1998

Related U.S. Application Data
(60) Provisional application No. 60/102,374, filed on Sep. 29, 1998.

(51) Int. Cl.$^7$ .................................................. G06F 17/30
(52) U.S. Cl. ..................... 707/200; 707/103; 707/511; 705/8; 705/9; 705/38; 709/201; 717/1
(58) Field of Search ................................. 707/5, 102, 103, 707/104, 1, 10, 201, 203, 511, 200; 705/7, 8, 9, 3, 38; 700/83; 709/201; 711/100; 717/1

(56) References Cited

U.S. PATENT DOCUMENTS 5,319,543 * 6/1994 Wilhelm ..................................... 717/1
5,684,990 * 11/1997 Boothby ................................. 707/203

(List continued on next page.)

FOREIGN PATENT DOCUMENTS

0447341A2   9/1991  (EP) ............................. G06F/15/21
96/21898    7/1996  (WO) ............................... G06F/9/00

OTHER PUBLICATIONS

Barthelmess P. et al: "Workflow Systems: A Few Definitions and a Few Suggestions", Conference on Organizational Computing Systems, US, New York, ACM, 1995, pp. 138–147.

Kappel, G. et al., "Hypermedia Document and Workflow Management Based on Active Object–Oriented Databases", Proceedings of the Thirtiet International Conference on System Science, Jan. 7–10, 1997. pp. 377–386 vol. 4.*

McClatchey, R. et al., "Version Management in a Distributed Workflow Application", Proceedings of the Eight International Workshop on Database and Expert Systems Applications, Sep. 1–2 1997, pp. 10–15.*

Schek, Hans–Jorg et al., "Hyperdatabases", Proceedings of the First International Conference on Web Information Systems Engineering, Jun. 19–21, 2000, vol. 1, pp. 14–23.*

Primary Examiner—Hosain T. Alam
Assistant Examiner—Shahid Alam
(74) Attorney, Agent, or Firm—Baker Botts LLP

(57) ABSTRACT

A computer program (38) for organization management can interact with a database (36) containing organization information, and includes a personnel administration module (41), a personnel development module (46), and a workflow engine (43). The personnel administration module can interact with the workflow engine to initiate a workflow to obtain approvals for a proposed change in the database. A supplemental program (51) is provided to permit the personnel development module to cause the workflow engine to initiate a workflow in association with a proposed change, and can interact with a scenario table and a scenario attributes table. The scenario table identifies different types of proposed changes, and identifies the particular workflow process to initiate for each such type. The scenario attributes table identifies one or more proposed changes which fall within each type, and indicates whether it is necessary to initiate a workflow for each such change.

15 Claims, 11 Drawing Sheets

U.S. PATENT DOCUMENTS

| | | | | |
|---|---|---|---|---|
| 5,794,042 | * | 8/1998 | Terada et al. | 705/3 |
| 5,806,078 | * | 9/1998 | Hug et al. | 707/511 |
| 5,812,016 | * | 9/1998 | Sumimoto | 707/201 |
| 5,819,295 | * | 10/1998 | Nakagawa et al. | 707/203 |
| 5,819,306 | * | 10/1998 | Goldman et al. | 711/100 |
| 5,826,239 | * | 10/1998 | Du et al. | 705/8 |
| 5,829,003 | | 10/1998 | Oklura | 707/100 |
| 5,870,545 | * | 2/1999 | Davis et al. | 709/201 |
| 5,878,403 | * | 3/1999 | DeFrancesco et al. | 705/38 |
| 5,960,420 | * | 9/1999 | Leymann et al. | 707/1 |
| 5,999,911 | * | 12/1999 | Berg et al. | 705/9 |
| 6,009,405 | * | 12/1999 | Leymann et al. | 705/9 |
| 6,041,306 | * | 3/2000 | Du et al. | 705/8 |
| 6,065,009 | * | 5/2000 | Leymann et al. | 707/10 |
| 6,067,477 | * | 5/2000 | Wewalaarachchi et al. | 700/83 |
| 6,073,109 | * | 6/2000 | Flores et al. | 705/8 |
| 6,073,111 | * | 6/2000 | Leymann et al. | 705/8 |
| 6,122,633 | * | 9/2000 | Leymann et al. | 707/10 |

* cited by examiner

FIG. 3

Position Attributes – Current Settings (Position)

System  Help

All Status   Detail

Position         st 1 2
Validity         29.08.1996   to   31.12.9999
Planning status  Active Description      0002    text1
Approval level   M68     Group Executive a    29.08.1996 to 31.12.9999
Part-Time Pos.   15.00   Hrs per week         29.08.1996 to 31.12.9999
Temporary        9       Months               29.08.1996 to 31.12.9999
                                              01.10.1996 to 31.12.9999
Building         BM-N202 EDS Rt 202-206  No   30.08.1996 to 31.12.9999

Selection Date  02.10.1996

Position Attributes - Current Settings (Position)

System  Help

Only active  Detail

Position       st 1 2
Validity       29.08.1996 to 31.12.9999
Planning status  Active Save and Submit

| Field | Value | | |
|---|---|---|---|
| Description | 0002 | text1 | |
| Approval level | M68 | Group Executive a | |
| Qual. Profiles | | | |
| Vacant | | | |
| Part-Time Pos. | 15.00 | Hrs per week | |
| Temporary | 9 | Months | |
| Source External | | | |
| Building | BM-N202 | EDS Rt 202-206 No | |
| Job Code | 106 | | |
| Reason | 108 | | |

Selection Date  02.10.1996

| From | To | Status | Action | |
|---|---|---|---|---|
| 29.08.1996 | 31.12.9999 | Active | Create Planned | 83 |
| 29.08.1996 | 31.12.9999 | Active | Create Planned | 84 |
| 29.08.1996 | 31.12.9999 | new | Create Planned | 85 |
| 29.08.1996 | 31.12.9999 | new | Create Planned | 86 |
| 29.08.1996 | 31.12.9999 | Active | Create Planned | 87 |
| 01.10.1996 | 31.12.9999 | Active | Create Planned | 88 |
| 29.08.1996 | 31.12.9999 | new | Create Planned | 89 |
| 30.08.1996 | 31.12.9999 | Active | Create Planned | 90 |
| 29.08.1996 | 31.12.9999 | new | Create Planned | 91 |

```
Position Attributes - Current Settings (Holder)         _ □ X
 Position        president
 Validity        29.08.1996  to   31.12.9999
 Planning status Active            Selection Date [02.10.1996 ▼]

┌─TDY assignment──────────────────────────────────────┐
 │  [10974]   Mr Sebastien Test                        │
 │  ◉ Internal Person                                  │
 │  ○ External Person            [29.08.1996] to [31.12.9999] │
 └─────────────────────────────────────────────────────┘

[ Exit ]  [ All status ]  [ Detail ]
                            │
                           138
```

FIG. 7

```
Position Attributes - Current Settings (Holder)         _ □ X
 Position        president
 Validity        29.08.1996  to   31.12.9999
 Planning status Active            Selection Date [02.10.1996 ▼]

┌─Admin. assignment (new)─────────────────────────────┐
 │  [    ]─158                        146─[Create Planned] │
 │  ◉ Internal Person                                  │
 │  ○ External Person            [29.08.1996] to [31.12.9999] │
 └─────────────────────────────────────────────────────┘

┌─TDY assignment (Active)─────────────────────────────┐
 │  [10974]   Mr Sebastien Test       147─[Create Planned] │
 │  ◉ Internal Person                                  │
 │  ○ External Person            [29.08.1996] to [31.12.9999] │
 └─────────────────────────────────────────────────────┘

[ Exit ] [ Only Active ] [ Detail ] [ Save ] [ Save and Submit ]
```

METHOD FOR INITIATING WORKFLOWS IN AN AUTOMATED ORGANIZATION MANAGEMENT SYSTEM

This application claims the priority under 35 U.S.C. § 119 of provisional application No. 60/102,374 filed Sep. 29, 1998.

STATEMENT REGARDING COPYRIGHT RIGHTS

A portion of this patent disclosure involves material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

This invention relates in general to automated techniques for organization management and, more particularly, to the capability for initiating a workflow within an automated organizational management system in order to obtain approvals for a proposed change.

BACKGROUND OF THE INVENTION

As computers have become progressively more common in the workplace, the tasks associated with organizational management have become progressively more automated. One known computer program for organizational management is available under the tradename SAP (Systems, Applications and Products in Data Processing), which is commercially available from SAP AG in Germany. The SAP program is designed to provide support for all aspects of what an organization may wish to do.

One aspect of the capabilities of the SAP software relates to support for human resources. In this regard, the SAP software has a personnel administration module, which handles matters specific to a particular employee, such as the employee's pay rate, implementation of a raise, implementation of a bonus, vacation time, sick time, and so forth. The SAP software also has a personnel development module, which handles matters such as an inventory of employee skills, an inventory of employee training and education, work force planning functions, and organizational management issues such as maintenance of the organizational hierarchy. Maintenance of the organizational hierarchy may include matters such as a permanent internal transfer of an employee, a temporary internal assignment or transfer of an employee, a change in the job code for a position, or filling a position from a source external to the organization. The SAP software also includes a workflow engine, which is capable of automatically obtaining the necessary approvals for a proposed change.

While the existing SAP program has been generally adequate for its intended purposes, it has not been satisfactory in all respects. For example, the personnel administration module is capable of interacting with the workflow engine in order to initiate or trigger a workflow. However, the personnel development module does not have the capability to interact with the workflow engine or trigger a workflow.

As one specific example, in the case of a permanent transfer of an employee from one position to another within the organization, the necessary approvals must all be obtained in advance in a manner external to the SAP program, for example by circulating a memo or other paper document. Then, after the necessary approvals have all been manually obtained, the proposed change can be manually implemented through the personnel development module, by one or more selected employees who have the authority to implement changes. However, in view of the progressive trend toward distributed processing, where the majority of employees have a computer, and where computers in geographically remote portions of an organization are typically linked, it is desirable for the approval process to be automated. A further consideration is that, even in the personnel administration module, each proposed change must be submitted immediately for implementation, which is not always desirable or convenient.

SUMMARY OF THE INVENTION

From the foregoing, it may be appreciated that a need has arisen for a method for effecting automated organizational management, which includes the capability for workflow, which preferably includes the capability to save proposed changes without submitting them immediately for implementation, and which preferably includes the capability to simultaneously implement several proposed changes that were previously saved. According to the present invention, a method is provided to address this need, and involves: maintaining a database of information; accepting from a user through a user input apparatus a proposed change to the database and a specified status therefor; saving a proposed change when the specified status therefor is a first status, without initiating implementation thereof; and processing a proposed change by initiating implementation thereof when the specified status therefor is a second status different from the first status, the processing step including the step of initiating a workflow where the proposed change having the second status requires a workflow.

BRIEF DESCRIPTION OF THE DRAWINGS

A better understanding of the present invention will be realized from the detailed description which follows, taken in conjunction with the accompanying drawings, in which:

FIG. 3 is a diagrammatic view of a screen which can be displayed for a user by the routine of FIG. 2;

FIG. 4 is a diagrammatic view of another screen which can be displayed for a user by the routine of FIG. 2;

FIG. 6 is a diagrammatic view of a screen which can be displayed for a user by the routine of FIG. 5;

FIG. 7 is a diagrammatic view of another screen which can be displayed for a user by the routine of FIG. 5.

DETAILED DESCRIPTION OF THE INVENTION

Figure 1:
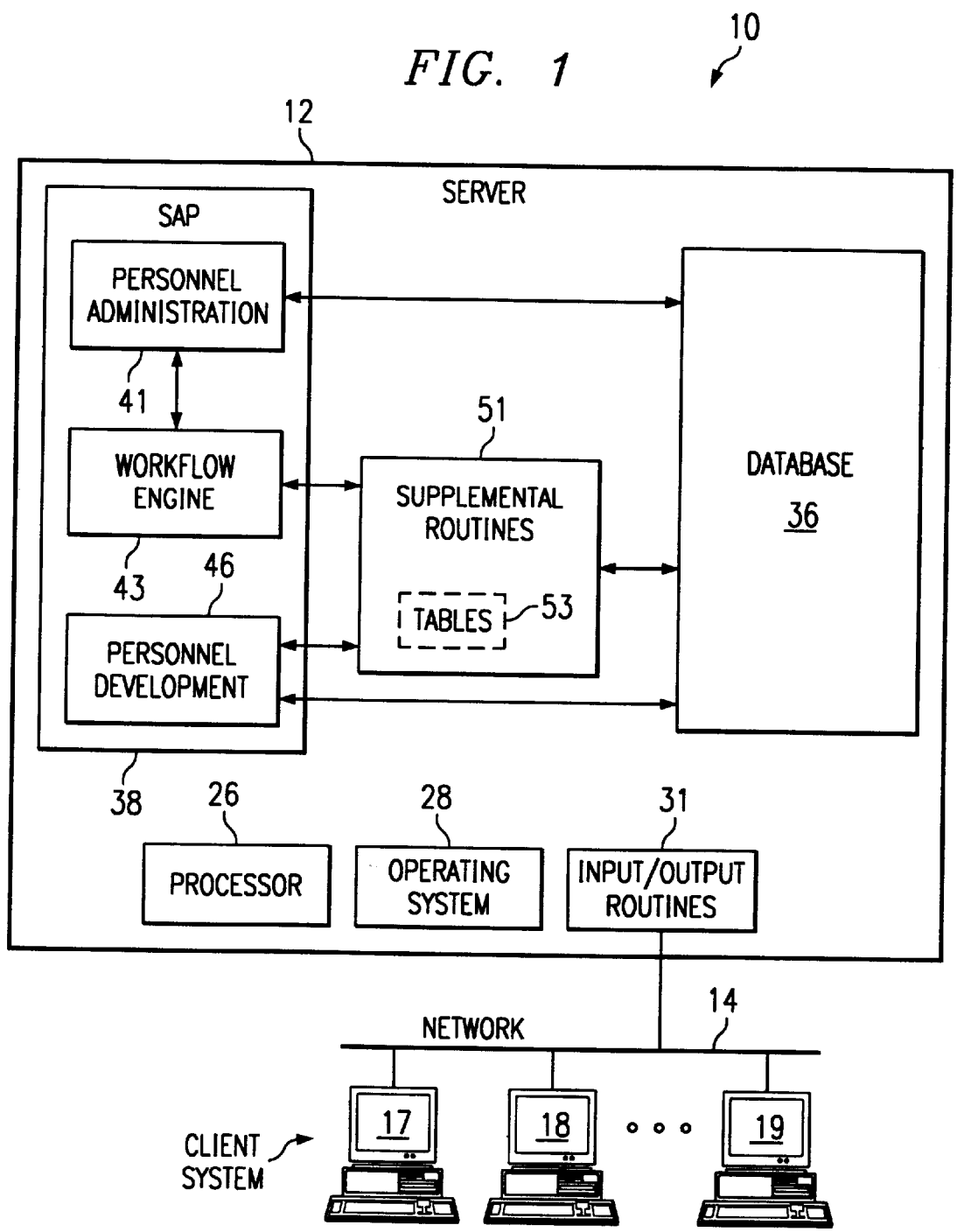
FIG. 1 is a block diagram of a system which facilitates automated organizational management and which embodies the present invention.

FIG. 1 is a diagrammatic view of a system 10 which embodies the present invention. The system 10 includes a computer 12 which functions as a server, and which is coupled by a network 14 to a plurality of client systems, three of which are shown at 17–19. The network 14 may be a local area network (LAN), a wide area network (WAN), a telephone line connection, some other type of network, or a combination of these different types of communication links. The client systems 17–19 in the disclosed embodiment are each a workstation or personal computer of a known type. The client systems may, for example, be on the desks of various employees of an organization, and the employees may be located in geographically remote locations.

The server 12 includes a processor 26 of a known type, which executes a suitable known operating system 28. Various software application programs can be executed by the processor 26 in conjunction with the execution of the operating system 28, including input/output routines 31 which facilitate communication between the server 12 and the network 14. The server 12 has a database 36 of information, which is stored in a not-illustrated memory or hard disk. In the disclosed embodiment, the database 36 contains information for an organization such as a corporation, including human resource information such as the names of employees, employee pay rates, employee bonus information, employee vacation information, employee skills, employee training, employee education, employee job codes, and a chain of command from each employee up through the management of the organization. In the case of a manager, all of the persons and/or other elements that are managed by a given manager constitute a "domain" of the manager. A manager cannot be a part of his own domain. A given manager can manage more than one domain.

A further application program, executed by the processor 26 in conjunction with the operating system 28, is an organizational management program 38, which is intended to provide support for virtually all aspects of what an organization may want to do. In the disclosed embodiment, the program 38 is a software package which is commercially available from SAP AG of Germany under the tradename SAP (Systems, Applications and Products in Data Processing). The SAP software 38 includes a number of different modules, which provide various types of functionality, including human resources functionality. The preferred embodiment of the present invention is disclosed in the specific context of an improvement to the human resources functionality of the SAP program 38, and therefore only a subset of the modules of the SAP software are illustrated and discussed here.

More specifically, the SAP software includes a personnel administration module 41, a workflow module or workflow engine 43, and a personnel development module 46, as well as other modules which are not illustrated. The personnel administration module 41 is used to handle matters which are specific to a given employee, such as the employee's pay rate, raises, bonus pay, vacation time, sick time, and so forth. The personnel development module 46 is used to handle human resources matters at the organizational level, including an employee skills inventory, an employee training inventory, an employee education inventory, work force planning capability, and maintenance of the organizational hierarchy. Four functions of specific interest which are handled by the personnel development module 46 include an employee transfer, an employee work assignment, a job code change, and a source external situation.

An employee transfer or assignment is a permanent transfer of an employee from one position to another position within the organization. The terms administrative assignment and employee transfer, as used herein, mean the same thing. A temporary duty assignment is a temporary transfer of an employee from one position to another position within the organization. The terms temporary duty (TDY) assignment and temporary transfer, as used herein, mean the same thing. A job code change is a change in the job code for a particular position, where it is to be understood that the system recognizes a distinction between a position and the person who is currently filling that position. A source external situation occurs in circumstances where a position is to be filled by a person or employee from outside the organization, or in other words a "source external". The personnel administration module 41 and the personnel development module 46 are each capable of interacting with the database 36, in order to read information from or write information to the database 36.

A workflow is an automated technique for obtaining the approval of two or more persons for some type of change to the information in the database 36. For example, if an employee is to be given a raise, it may require only the approval of the employee's manager. If the manager is implementing the change, then it is not necessary to obtain the approval of another person, and the change can be immediately implemented. On the other hand, if the raise needs to be approved by two managers in the employee's chain of command, then the workflow engine 43 will initiate a workflow in order to automatically obtain the approval of both managers. Then, after approvals have been obtained from both managers, the workflow engine will initiate implementation of the change.

For example, the workflow engine 43 may route an electronic communication to the electronic mailbox of one manager. After that manager accesses the electronic communication and enters the necessary electronic approval, the workflow engine 43 will forward the electronic communication to the electronic mailbox of the second manager. After the second manager has accessed the electronic communication and entered the necessary electronic approval, the workflow engine 43 will automatically initiate an update to the database 36 in order to implement the approved raise. A technique for handling the routing of workflows is disclosed in copending U.S. Ser. No. 08/921,130 filed Aug. 29, 1997, the disclosure of which is hereby incorporated herein by reference.

In the SAP software 38, the personnel administration module 41 is capable of directly interacting with the workflow engine 43. Consequently, as to matters which are handled using the personnel administration module 41, and which require multiple approvals, the personnel administration module 41 can automatically trigger a workflow operation by the workflow engine 43. Initiation of a workflow operation is sometimes referred to as "publishing an event".

In contrast, the SAP personnel development module 46 does not inherently have the capability to interact directly with the workflow engine 43, and in particular does not have the capability to publish an event to the workflow engine 43 in order to trigger a workflow. Therefore, in accord with the present invention, a plurality of supplemental routines 51 are provided, along with a table structure 53 which includes two tables. These two tables are a scenario table and a scenario attributes table, which are respectively shown below in TABLE 1 and TABLE 2, and which are both described in more detail later.

The supplemental routines 51 are executed by the processor 26 in conjunction with execution of the operating system 28. The supplemental routines 51 interface with the personnel development module 46 and also the workflow engine 43, so that on behalf of the module 46 the supplemental routines 51 can publish an event to the workflow engine 43 in order to initiate a workflow, thereby giving workflow capability to the personnel development module 46. The supplemental routines 51 can also read data from and write data to the database 36.

Figure 2:
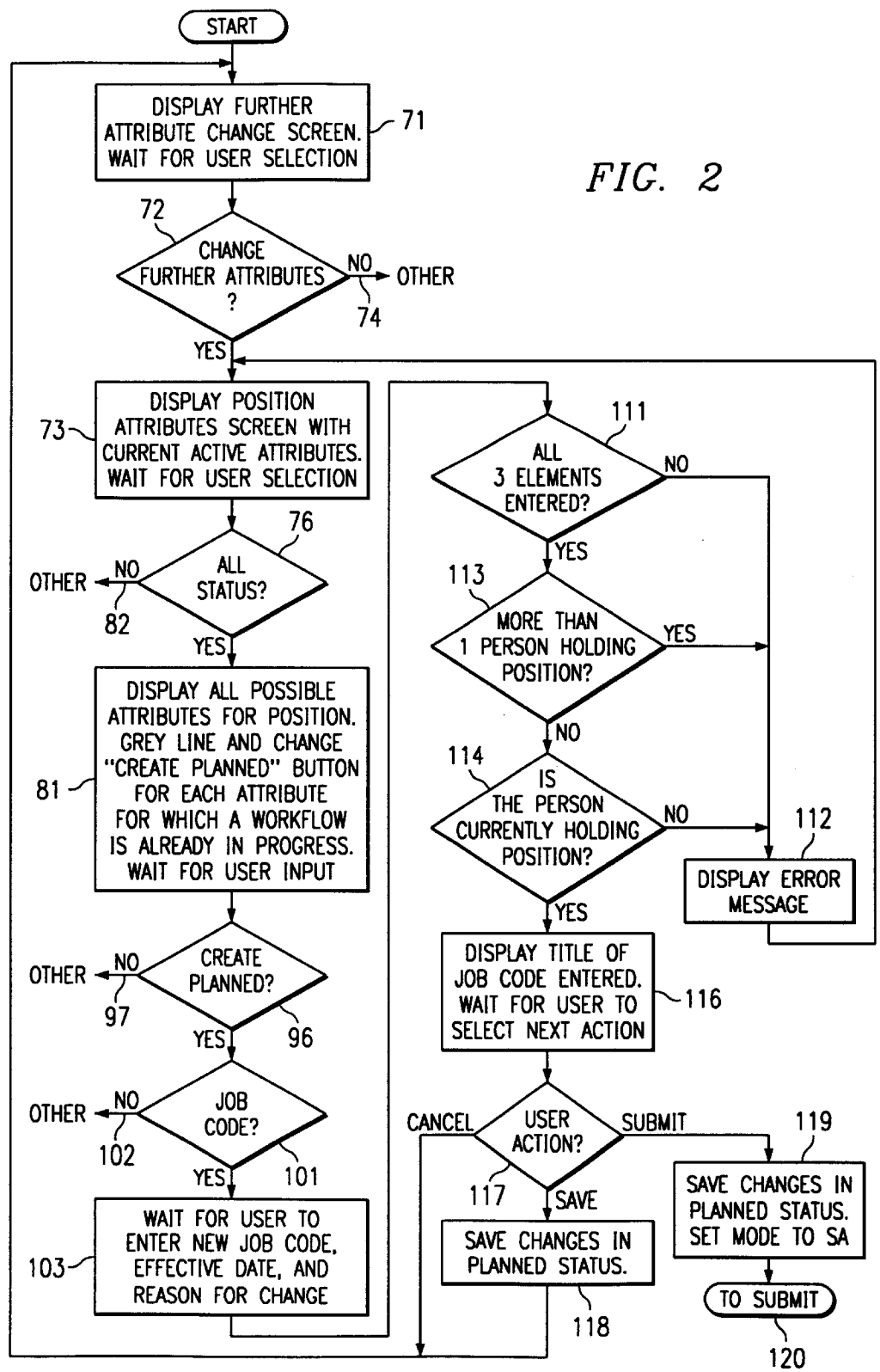
FIG. 2 is a flowchart depicting the operation of a software routine which is part of the system of FIG. 1.

FIG. 2 is a flowchart which shows in more detail certain aspects of the operation of the personnel development module 46 and the supplemental routines 51. At block 71, the personnel development module 46 displays on the display of one of the client systems 17–19 a further attribute change screen, which is a standard SAP screen, and which is not illustrated. The system then waits for a user to make a selection from several available options. At block 72, the user's selection is evaluated. In particular, if the user identifies a position by clicking on it and then clicks a CHANGE FURTHER ATTRIBUTES button, which is not illustrated, control will proceed to block 73, which is the start of one of the supplemental routines 51. Alternatively, if the user makes any other selection, control will proceed at 74 to some other routine within the personnel development module 46, which is not necessary to an understanding of the present invention and is therefore not described in detail.

At block 73, the supplemental routines 51 display a position attributes screen, which depicts current active attributes. FIG. 3 is a diagrammatic view of this position attributes screen, which is a new screen that replaces one of the preexisting screens inherent in the personnel development module 46. At block 73, the supplemental routines 51 wait for the user to make a selection within the position attributes screen of FIG. 3. The user selection is evaluated at block 76.

In particular, if the user clicks an ALL STATUS button 78, then control will proceed to block 81, which will be discussed later. On the other hand, if the user makes any selection other than the button 78, control will proceed at 82 to some other routine, which is not relevant to the present invention and therefore not depicted and described in detail. In block 81, the position attributes screen of FIG. 3 is replaced with an expanded version thereof, which is shown in FIG. 4 and which shows all attributes for the particular position in question. The screen has several CREATE PLANNED buttons 83–91, which each correspond to a respective attribute. Also in block 81, a determination is made of whether a workflow is already in progress for any of these attributes. For each attribute which is found to have a workflow already in progress, a corresponding one of the CREATE PLANNED buttons 83–91 is changed to a DISPLAY SUBMITTED button, and the rest of the line to the left of that button is grayed. This indicates to the user that each grayed attribute cannot currently be selected for a change. Then, still in block 81, the system waits for user input.

At block 96, the system checks to see whether the user has clicked one of the CREATE PLANNED buttons 83–91. If not, then control proceeds at 97 to some other routine, which is not relevant to the present invention and is therefore not described in detail here. For purposes of obtaining an understanding of the present invention, it is sufficient to describe what happens in response to selection of one of the CREATE PLANNED buttons 83–91. The CREATE PLANNED button 91 for a job code change has been arbitrarily selected for a detailed explanation below. However, it will be recognized that a generally similar technique is used to handle each of the other eight CREATE PLANNED buttons 83–90 in FIG. 4.

More specifically, at block 101 in FIG. 2, the system checks to see which of the CREATE PLANNED buttons 83–91 has been clicked. Assuming for the sake of example that it is one of these buttons other than button 91, control proceeds at 102 to some other routine. Alternatively, however, if it is determined at block 101 that the user specifically selected the button 91, then control proceeds to block 103, where the system waits for the user to enter a new job code in blank 106 of FIG. 4, an effective date for the job code change at 107 in FIG. 4, and a reason for the job code change at 108 in FIG. 4.

Then, at block 111, the system checks to see if the blanks 106–108 have all been completed. If not, then control proceeds to block 112, where the system displays an appropriate error message, and then returns to block 173. Alternatively, if it is found at block 111 that blanks 106–108 have all been completed, then control proceeds to block 113, where the system checks to see if more than one person is scheduled to hold this position over time. For example, the system may find that the person currently holding the position is due to be transferred out of the position at the end of the current year, and that a new person is scheduled to be transferred into the position at that time. If the system determines that more than one person is already scheduled to hold the position over time, then a change in the job code would create a problem and is rejected. More specifically, control proceeds to block 112, where an appropriate error message is displayed, and then control returns to block 73.

On the other hand, if only one person is presently scheduled to hold the position over time, then control proceeds from block 113 to block 114, where the system checks to see if the particular person identified in block 113 is currently holding the position. If not, for example if the person is not scheduled to assume the position until a future date, then the job code change is rejected, and control proceeds to block 112, where an appropriate error message is displayed. From block 112, control returns to block 73. Alternatively, however, if it is determined at block 114 that the only person scheduled to hold the position is currently holding the position, then control proceeds to block 116.

At block 116, the system determines the title of the job which is associated with the new job code entered in blank 106, and displays this title to the right of blank 106. Then, the system waits for the user to take appropriate action, as evaluated at block 117. In this regard, the user has three options. The first option is to cancel the proposed job code change, and selection of this option causes control to proceed from block 117 back to block 71. A second option is to save the proposed job code change without initiating an attempt to implement it. If the user selects this option, control proceeds from block 117 to 118, where the system saves the proposed change with an indication that it has "planned" status, which means that the proposed change is being saved without any current attempt to implement it. From block 118, control returns to block 71.

The third option available to the user at block 117 is to submit the proposed change for implementation. This option causes control to proceed from block 117 to block 119, where the proposed change is saved with an indication that it has "planned" status. In addition, a mode indicator is set to "SA", which is an indication that the proposed change is being submitted for implementation by the screen of FIG. 4. Control is then transferred at 120 to a SUBMIT routine, which handles implementation of the proposed change, and which is discussed in more detail later.

Figure 5A:
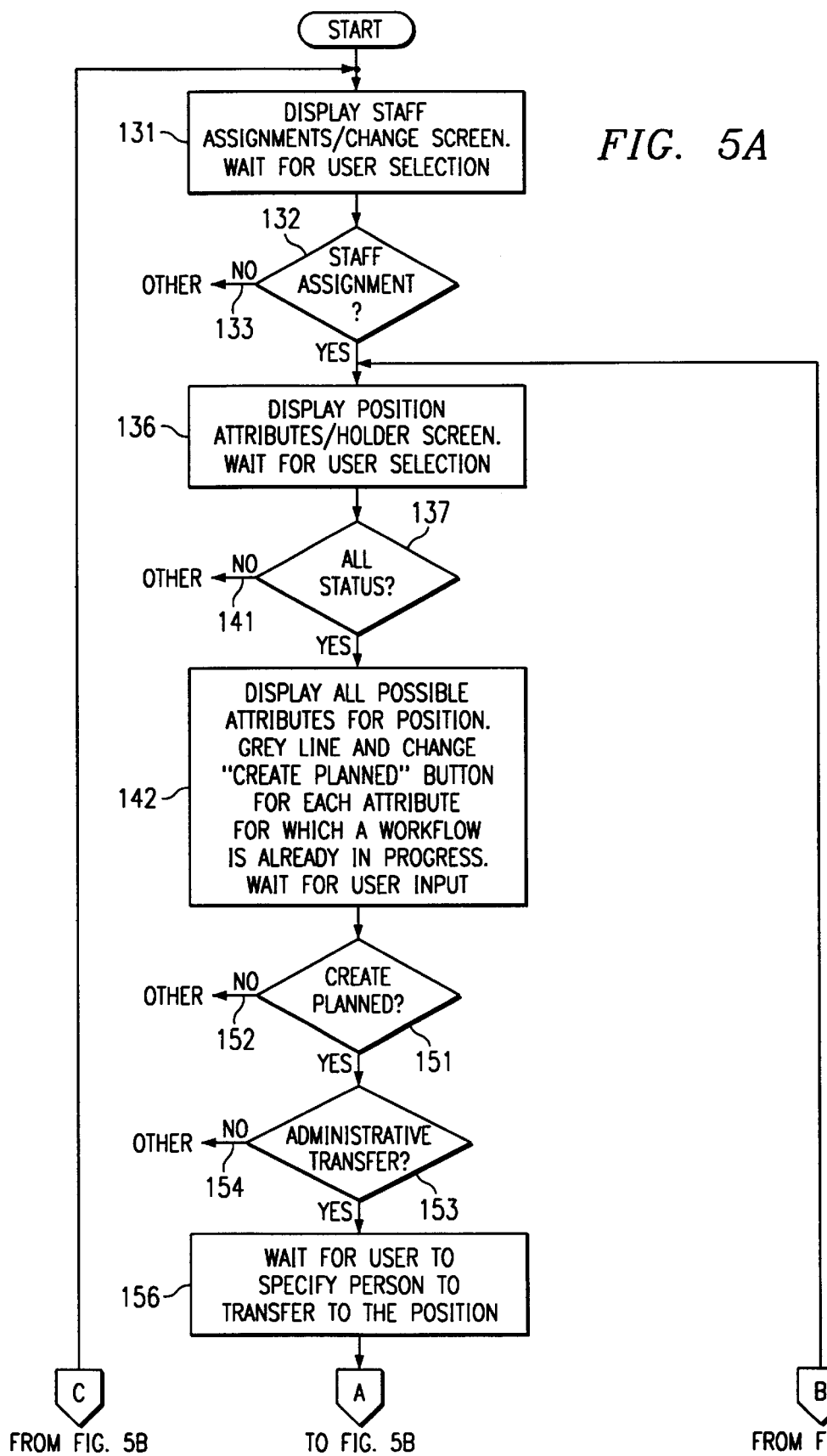
FIG. 5 is a flowchart depicting the operation of a further software routine which is part of the system of FIG. 1.
Figure 5B:
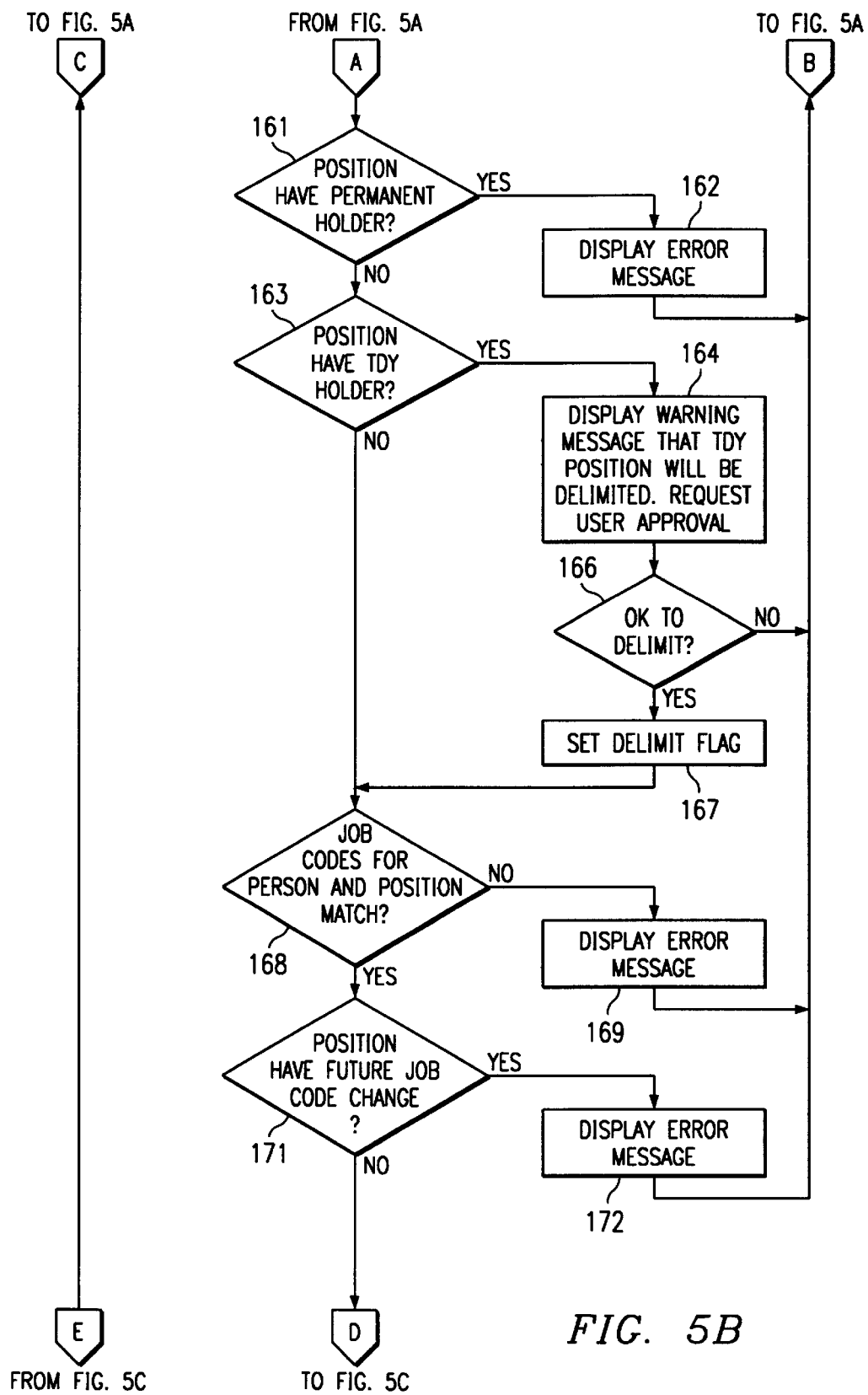
Figure 5C:
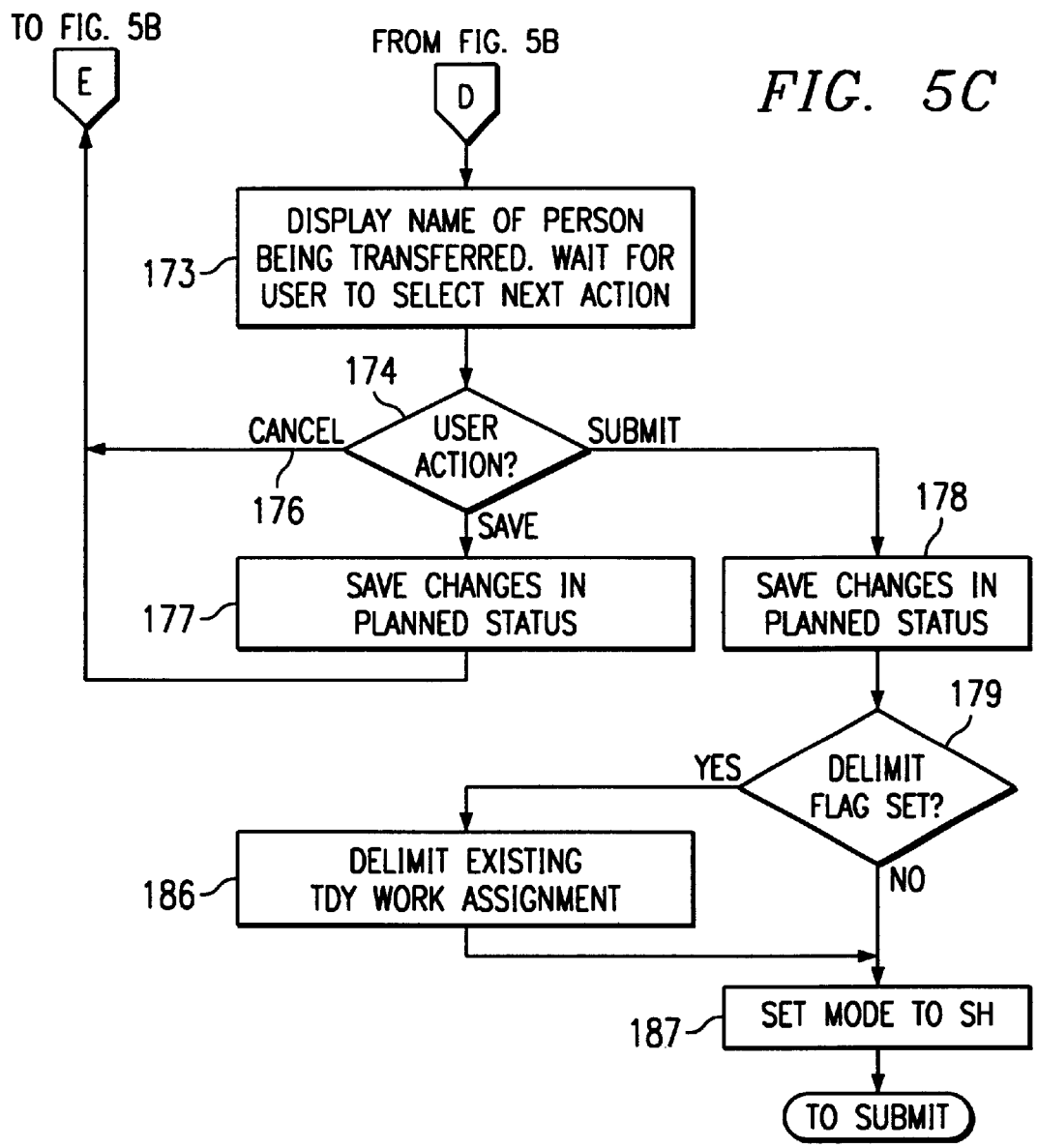

FIG. 5 is a further flowchart which shows in more detail certain additional aspects of the operation of the personnel development module 46 and the supplemental routines 51 of FIG. 1. In block 131, which represents a portion of the personnel development module 46, the system displays a staff assignment change screen, which is a not-illustrated screen standard to SAP and inherent in the personnel development module 38. The system then waits for the user to make a selection. Then, at block 132, the system evaluates the selection made by the user.

If the user takes an action other than clicking a STAFF ASSIGNMENT button, control proceeds at 133 to some other routine, which is a standard part of the personnel development module 46, which is not relevant to the present invention, and which is therefore not described in detail. On the other hand, if it is determined at block 132 that the user has clicked the STAFF ASSIGNMENT button, then control proceeds to block 136, which is a part of the supplemental routines 51. In block 132, the system displays a position attributes screen, which is shown diagrammatically in FIG. 6. Then, still at block 136, the system waits for the user to make a selection. At block 137, the system evaluates the user selection.

More specifically, if the user takes any action other than clicking the ALL STATUS button 138 of FIG. 6, control proceeds at 141 to some other routine, which is not relevant to the present invention and which is not described in detail. Otherwise, if the user clicks the ALL STATUS button 138, control proceeds from block 137 to block 142, where the system replaces the screen of FIG. 6 with an expanded version thereof, which is shown in FIG. 7 and which displays all possible attributes for the selected position. In block 142, the system also determines whether a workflow is already in progress for any of the attributes displayed in the screen of FIG. 7. If so, then the system changes a CREATE PLANNED button 146 or 147 which corresponds to that attribute to a DISPLAY SUBMITTED button. Further, the system grays the rest of the line to the left of that button, to indicate to the user that it is not currently possible to propose a change for that particular attribute. The system then waits for user input.

At block 151, the system checks to see if the user has clicked one of the CREATE PLANNED buttons 146 or 147. If not, or in other words if the user has taken any other action, then control proceeds at 152 to some other routine, which is not relevant to the present invention and is therefore not illustrated in detail.

In FIG. 7, the CREATE PLANNED button 146 corresponds to an administrative assignment, which is a permanent assignment or transfer. The CREATE PLANNED button 147 corresponds to a temporary duty (TDY) assignment, which is a temporary assignment such as a loan of a person to a given position for a limited time period. For purposes of facilitating an understanding of the present invention, it will be sufficient to describe in detail the handling of only one of an administrative assignment and a temporary duty assignment. With this in mind, an administrative assignment (permanent transfer) has been arbitrarily selected for discussion in greater detail, which corresponds to actuation of the CREATE PLANNED button 146. However, it will be recognized that the CREATE PLANNED button 147 would be handled in a generally similar manner.

In more detail, when control proceeds from block 151 to block 153, the system checks to see if the CREATE PLANNED button clicked by the user is the button 146 for an administrative assignment. If not, or in other words if the user clicked the CREATE PLANNED button 147 for a temporary duty assignment, then control will proceed at 154 to another routine, which is not disclosed and described in detail. Otherwise, however, if the user clicked the CREATE PLANNED button 146, control will proceed from block 153 to block 156. At block 156, the system waits for the user to identify the person who is to be transferred to the selected position. The user identifies the person by typing the employee number of this person in the text box shown at 158 in FIG. 7. Once the user has done this, control proceeds from block 156 to block 161, where the system checks to see if the position is already filled by an employee who is permanently assigned to that position. If so, and since it is not possible for two employees to hold the same position at the same time, then the proposed transfer cannot be implemented, and control proceeds to block 162, where the system displays an appropriate error message. Control then proceeds from block 162 back to block 136.

Alternatively, if it is determined at block 161 that there is no employee who is permanently assigned to the position of interest, then at block 163 the system checks to see if there is an employee who is temporarily assigned to the position of interest. If there is an employee who is temporarily assigned, then it is possible to "terminate" or "delimit" the existing temporary assignment, effectively on the date that the proposed permanent assignment would start, in order to implement the proposed permanent assignment to that position. Therefore, control proceeds to block 164, where the system displays a message warning that the temporary duty (TDY) assignment must be delimited in order to proceed, and requests user approval. Then, at block 166, the system checks to see whether the user has approved delimiting of the temporary assignment. If the user does not approve the delimiting, then the proposed permanent assignment is dropped, and control returns to block 136. On the other hand, if the user approves delimiting of the existing temporary assignment, then control proceeds to block 167, where the system sets a DELIMIT flag, after which control proceeds to block 168. Control also proceeds directly from block 163 to block 168 if it is determined at block 163 that the position in question does not have any employee assigned to it on a temporary basis.

At block 168, the system checks to see whether the job code for the position is the same as the job code associated with the person who is proposed for assignment to the position, namely the person whose employee number has been entered in text box 158 of FIG. 7. If the job codes of the employee and the position do not match, then the employee cannot be assigned to the position. Control therefore proceeds to block 169, where the system displays an appropriate error message. After that, control proceeds from block 169 back to block 136. On the other hand, if there is a match between the job codes for the employee and the position, then control proceeds from block 168 to block 171.

In block 171, the system checks to see whether the database 36 shows that the position in question will undergo a change in its associated job code at some future date. If so, then the job codes of the employee and the position would not match after that date, and therefore the employee cannot be assigned to the position now. Control therefore proceeds to block 172, where the system displays an appropriate error message, and then control returns to block 136. If no future change in the job code is scheduled, then control proceeds from block 171 to block 173, where the system displays the name of the person who is proposed to be transferred. In particular, the name of the person would appear to the right of the text box 158 in FIG. 7. The system then waits for the user to select the next action to take. The user has three options, which are handled in block 174.

In particular, the user is permitted to cancel the proposed change, in which case control proceeds at 176 back to block 131. Alternatively, the user may elect to save the proposed change without submitting it for implementation, in which case control proceeds to block 177, where the proposed change is saved with a "planned" status. Control then proceeds from block 177 back to block 131.

The third option is to submit the proposed change for implementation. If the user selects this option, then control proceeds from block 174 to block 178, where the system saves the proposed change with "planned" status. Then, at block 179, the system checks to see whether the DELIMIT flag has been set by block 167. If so, then control proceeds to block 186, where the system delimits the existing temporary duty work assignment. In more detail, the system effects a change in the database 36 which ends the temporary duty assignment, effective immediately. From block 186, control proceeds to block 187. Control also proceeds directly from block 179 to block 187 if it is found at block 179 that the DELIMIT flag is not set.

In block 187, the system sets the mode indicator to "SH", which is an indication that this particular proposed change was initiated from the screen of FIG. 7. Then, at block 188, control is transferred to a SUBMIT routine. This is the same SUBMIT routine mentioned above in association with block 120 of FIG. 2. The SUBMIT routine will now be described in more detail with reference to FIG. 8.

Figure 8A:
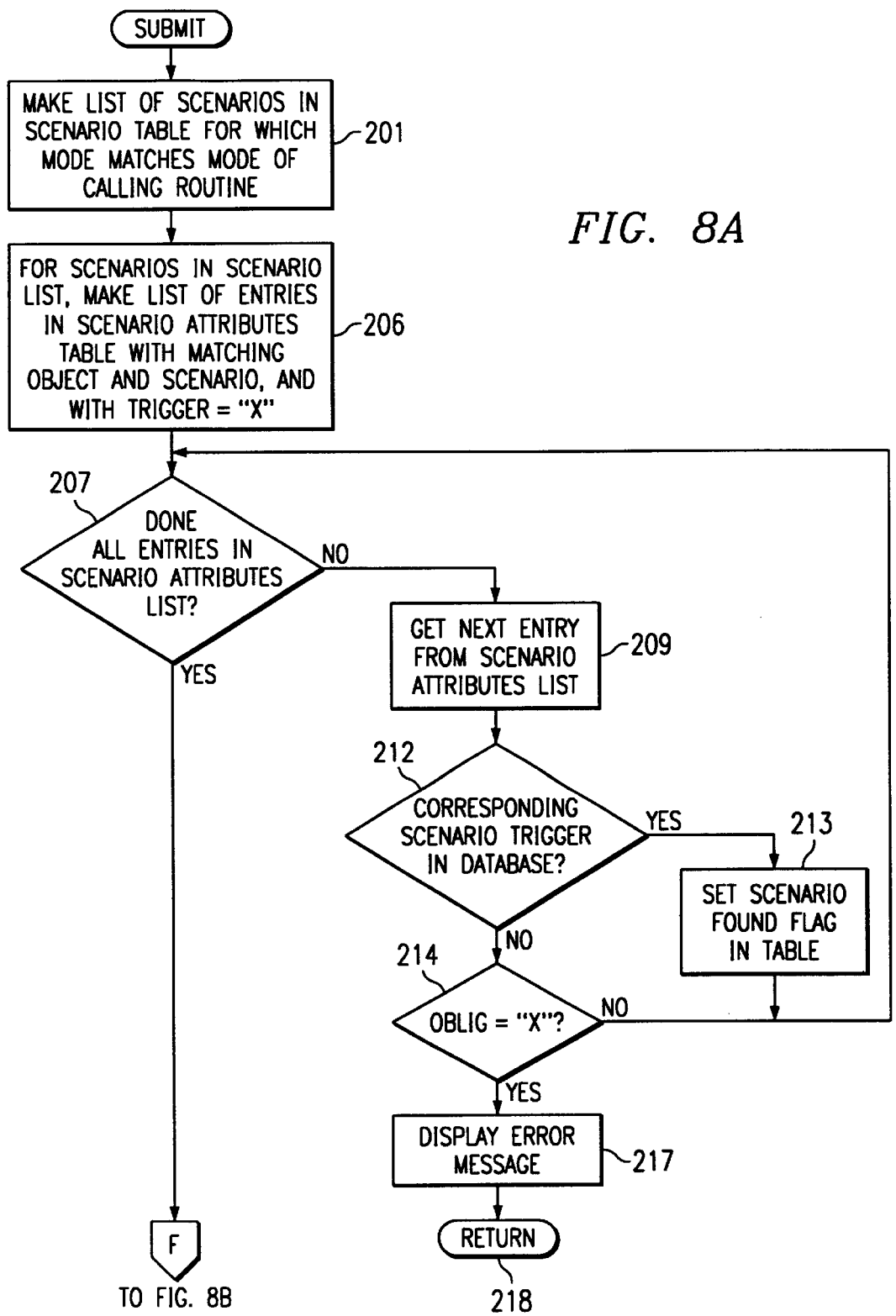
FIG. 8 is a flowchart depicting the operation of a further software routine which is part of the system of FIG. 1.
Figure 8B:
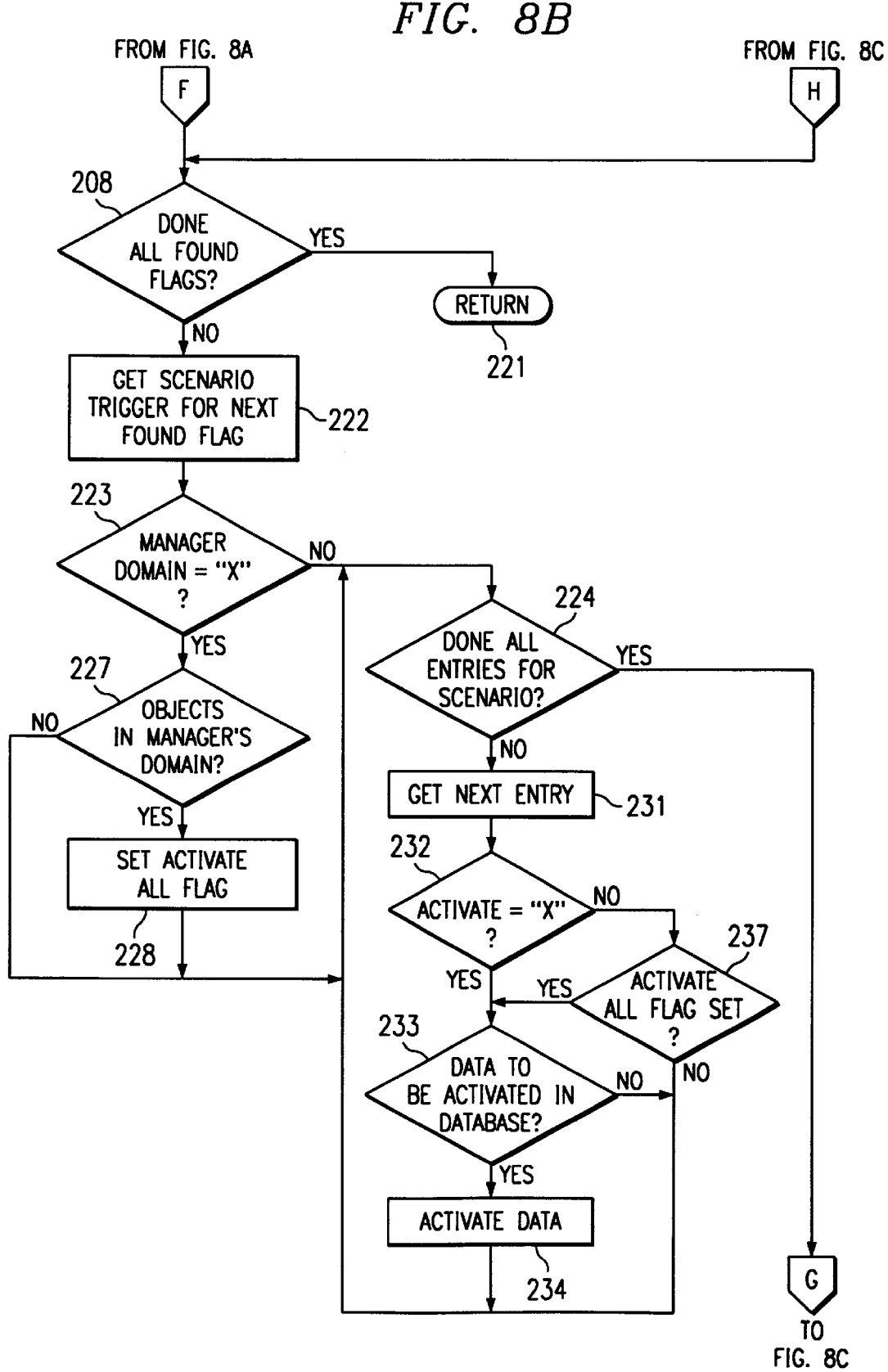
Figure 8C:
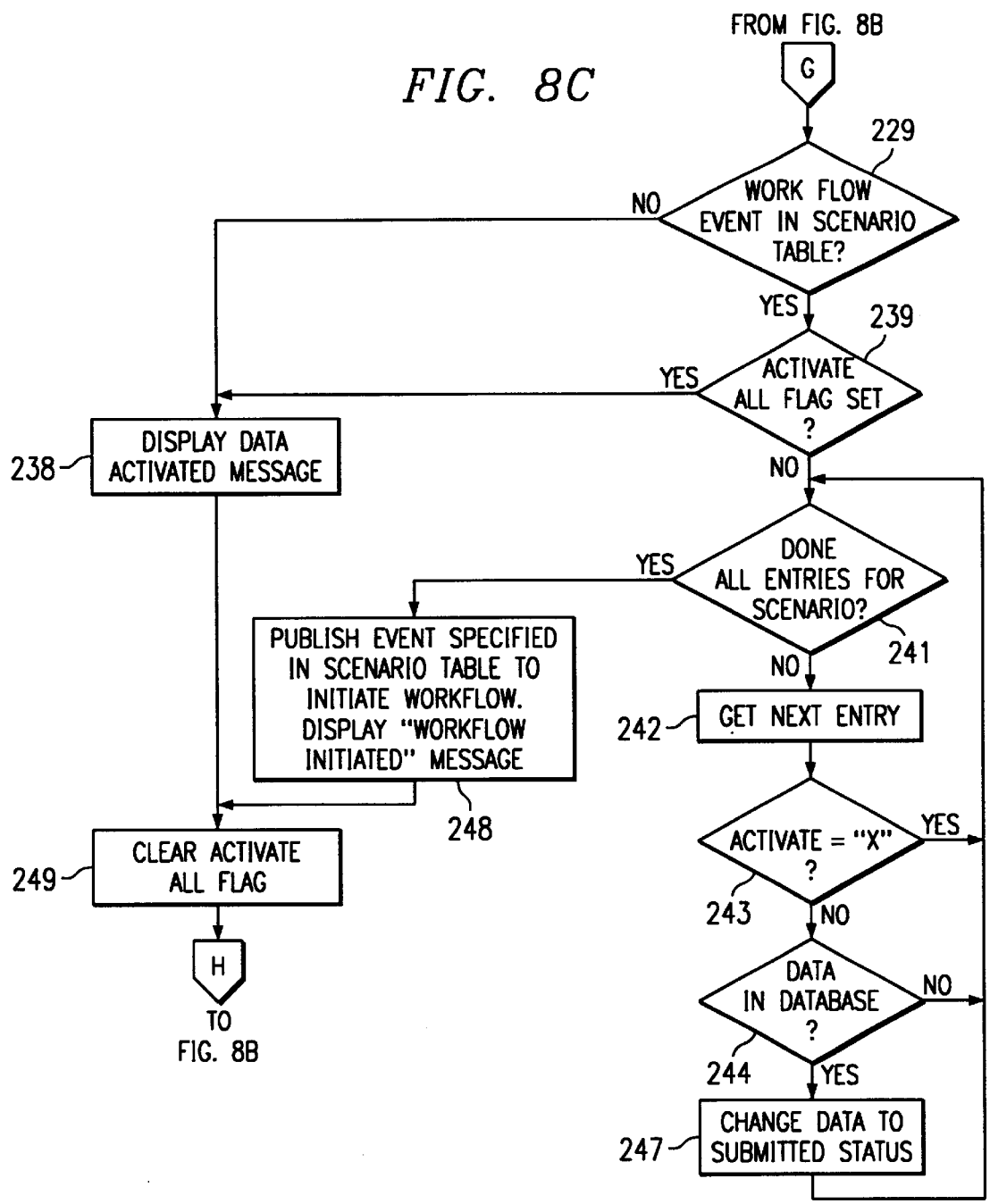

FIG. 8 is a flowchart showing the SUBMIT routine, which is a further portion of the supplemental routines 51 of FIG. 1. The SUBMIT routine interacts with the two tables which are indicated diagrammatically at 53 in FIG. 1. The first of these tables is the scenario table, which appears in this text as TABLE 1. The second of these two tables is the scenario attributes table, which appears in this text as TABLE 2.

As previously discussed, the routine of FIG. 2 sets the mode indicator to "SA" before calling the SUBMIT routine of FIG. 8, whereas the routine of FIG. 5 sets the mode indicator to "SH" before calling the SUBMIT routine of FIG. 8. In block 201 of FIG. 8, the system takes the mode value passed to it in the mode indicator by the calling routine, and makes a scenario list identifying the rows in the scenario table (TABLE 1) which have this same value in the MODE column. For example, if the calling routine (FIG. 5) set the mode indicator to "SH", the scenario list would identify the third and fourth rows of the scenario table. Alternatively, if the calling routine (FIG. 2) set the mode indicator to "SA", the scenario list would identify the fifth through seventh rows of the scenario table.

Each row of the scenario table corresponds to a respective scenario, a brief textual summary of which is given in the LTEXT column of that row. If the WORKFLOW OBJECT and EVENT columns of the row are blank, then no workflow is required for that scenario. On the other hand, if there are entries in the WORKFLOW OBJECT and EVENT columns, then a workflow may or may not be required, depending on information in the scenario attributes table (TABLE 2), as discussed later. As to those rows in the scenario table which do have an entry in the WORKFLOW OBJECT and EVENT columns, it will be noted that the entries differ from row to row. These different entries specify respective types of workflow which can be carried out by the workflow engine 43 (FIG. 1). From block 201 of FIG. 8, control proceeds to block 206. In block 206, the system successively processes each of the scenarios from the scenario table which it included in the scenario list that it prepared in block 201. For each such scenario in the list, the system takes the entries from the OBJECT and SCENARIO columns of the scenario table (TABLE 1), and makes a list of rows or entries in the scenario attributes table (TABLE 2) which have identical entries in the OTYPE and SCENARIO columns and which have an "X" in the TRIGGER column. For example, if the mode were "SH", so that the scenario list included the third and fourth rows of the scenario table, the scenario attributes list would include the sixth and seventh rows of the scenario attributes table. Alternatively, if the mode was "SA", so that the scenario list included the fifth through seventh entries of the scenario table, then the scenario attributes list would include the eighth, seventeenth and eighteenth rows of the scenario attributes table.

Each row in the scenario attributes table corresponds to a particular type of change which the user can propose, and it should be evident that several types of changes may be associated with a single given scenario. For example, change types corresponding to the eighth through sixteenth rows of the scenario attributes table all correspond to a single scenario, which is represented by the fifth row of the scenario table.

The scenario attributes table has a TRIGGER column and an ACTIVATE column. If there is an "X" in the ACTIVATE column, then the type of change associated with the row can be "activated", or in other words implemented immediately, without any need for a workflow to obtain approvals. That is, if there is an "X" in the ACTIVATE column, then the entries in the WORKFLOW OBJECT and EVENT columns in the corresponding row of the scenario table can be ignored. If there is an "X" in the TRIGGER column, then the change type associated with that row of the scenario attributes table is given a greater level of importance during processing of proposed changes, as described in more detail later. Also, if there is an "X" in the TRIGGER column, then the entries in the WORKFLOW OBJECT and EVENT columns of the corresponding row of the scenario table specify a particular workflow procedure associated with this particular row of the scenario attributes table.

From block 206, control proceeds to block 207, which is the start of a loop in which the system processes the entries in the scenario attributes list. In block 207, the system checks to see if it has processed all entries in the scenario attributes list. When all entries have been processed, then control will proceed to block 208. The first time through the loop, however, control will proceed to block 209, where the system gets the next entry from the scenario attributes list. The first time through the loop, this will be the first entry in the list. Control then proceeds to block 212.

When the SUBMIT routine of FIG. 8 is entered, the system will necessarily include one proposed change which has been saved with "planned" status, which is the proposed change that the user has submitted for implementation. However, as evident from the preceding discussion, the user also has the option of saving proposed changes with a "Planned" status, without immediately submitting them for implementation. Thus, the system may also include a number of other proposed changes which have been saved with "planned" status but which have not been implemented.

When any proposed change is passed to the SUBMIT routine of FIG. 8 for implementation, the SUBMIT routine will implement not only that proposed change, but also all other proposed changes which have been saved with "planned" status, and which fall within the same mode category as the change which has been submitted. Stated differently, when a proposed change is submitted for implementation from the screen of FIG. 4, all proposed changes which have been saved for the screen of FIG. 4 are considered for implementation. Similarly, when a proposed change is submitted for implementation from the screen of FIG. 7, all proposed changes for the screen of FIG. 7 are considered for implementation.

Thus, in block 212, the system checks the database 36 for any proposed change which has been saved with "planned" status, and which corresponds to the current entry from the scenario attributes list. This is done by taking the values for the DATA IDENTIFIER, SUBTY, and STATUS columns from the selected row of the scenario attributes table, and then looking for a proposed change which has been saved in the database 36 and which has identical values specified for data identifier, subtype and status. If such a proposed change is found, then a FOUND flag is set in the associated row of the scenario table, in block 213.

Since the FOUND flags are each closely associated with a respective row of the scenario table, the disclosed embodiment includes them as a part of the scenario table (TABLE 1), in the form of a separate column in that table. However, since this is the only portion of the scenario table which dynamically changes during system operation, the FOUND flags could alternatively be implemented in the form of a further table which is logically separate from the scenario table and the scenario attributes table. It is assumed that the FOUND flags are all in a reset state when the SUBMIT routine begins. If necessary, the FOUND flags could all be forcibly cleared at the start of the SUBMIT routine, although the flowchart of FIG. 8 does not expressly show this. From block 213, control proceeds back to block 207.

If the system determined at block 212 that the database 36 did not include any proposed change corresponding to the current entry of the scenario attributes lists, then control would proceed to block 214, where the system checks to see whether the OBLIG column of the associated row of the scenario table contains an "X". If so, then this particular scenario is required for the current object and mode, and the absence from the database 36 of a corresponding proposed change represents an error. Accordingly, control proceeds from block 214 to block 217, where the system displays an appropriate error message. Then, at 218, the system exits the SUBMIT routine by returning to the calling program. If, on the other hand, it was determined at block 214 that the corresponding row of the scenario table did not have an "X" in the OBLIG column, then control would have proceeded from block 214 back to block 207.

When it is determined at 207 that all entries in the scenario attributes list have been processed, the system will exit the loop by proceeding to block 208. Block 208 is the beginning of a loop in which the system will process each row of the scenario table for which the FOUND flag has been set. If none of the FOUND flags have been set, then the system immediately exits the SUBMIT routine at 221 by performing a return to the calling routine. However, if at least one FOUND flag has been set, then control proceeds to block 222, where the system selects the next scenario associated with a FOUND flag. The first time through the loop, this will be the first scenario having its FOUND flag set.

At block 223, the system checks the current row of the scenario table to see if the MGR DOMAIN column contains an "X". The presence of an "X" means that, if all of the elements of the proposed change are within the domain of a given manager, the manager has the authority to make the change, and it is not necessary to initiate a workflow in order to get the approval of anyone else. If there is no "X", then control proceeds to block 224. Otherwise, control proceeds to block 227, where the system determines whether all of the elements or objects affected by the proposed change are within the domain of the manager proposing the change. If not, then control proceeds to block 224. Otherwise, at block 228, the system sets an ACTIVATE ALL flag. From block 228, control proceeds to block 224.

Block 224 is the start of a loop which processes each entry or row of the scenario attributes table that corresponds to the current scenario from the scenario table. If all such entries of the scenario attributes table have been processed, then control proceeds to block 229. Otherwise, control proceeds to block 231, where the system gets the next appropriate entry from the scenario attributes table. The first time through the loop, this will be the first entry corresponding to the current scenario.

At block 232, the system checks to see whether this row or entry of the scenario attributes table has an "X" in the ACTIVATE column. If so, then control proceeds to block 233, where the system checks to see whether the data to be activated, or in other words the proposed change, is present in the database 36. If not, control proceeds to block 224. Otherwise, control proceeds to block 234 where the system activates that particular data. In other words, the system implements the change in question by making appropriate changes in the database 36. From block 234, control proceeds back to 224.

If it was determined in block 232 that the ACTIVATE column did not include an "X", then control would proceed to block 237, where the system checks to see whether the ACTIVATE ALL flag has been set. If so, then control proceeds to block 233. If not, control proceeds back to block 224. When all rows in the scenario attributes list which correspond to the current scenario have been processed, control proceeds from block 224 to block 229.

In block 229, the system checks to see whether the current scenario has an entry in the EVENT column of the scenario table. If not, then no workflow is required, and the associated data has already been activated (at block 234). Control proceeds to block 238, where the system displays a message indicating that the data has been activated, or in other words that one or more proposed changes have been implemented. Otherwise, control proceeds to block 239, where the system checks to see whether the ACTIVATE ALL flag is set. If so, then no workflow is required, because all elements affected by the change are within the domain of a given manager, and because the data has therefore already been activated at block 234. Control therefore proceeds from block 239 to block 238, for the display of the message indicating that the data has been activated.

On the other hand, if the ACTIVATE ALL flag is not set, control proceeds from block 239 to block 241. Block 241 is the start of a loop in which the system processes each entry in the scenario attributes table which corresponds to the current scenario. In block 241, the system checks to see whether it has processed all such entries. The first time through the loop it will find that it has not, and it will proceed to block 242, where it will select the next entry in the scenario attributes table. The first time through the loop, this will be the first qualifying entry.

Control then proceeds to block 243, where the system checks to see whether that entry or row of the scenario attributes table has an "X" in the ACTIVATE column. If so, then no workflow is required, and control proceeds back to block 241. Otherwise, control proceeds to block 244, where the system checks to see whether the database contains a proposed change which corresponds to the current entry or row of the scenario attributes table. If the database has no corresponding data, then there is no need for a workflow, and control proceeds from block 244 back to block 241. Otherwise, control proceeds to block 247, where the system modifies the database 36 to switch that proposed change from "planned" status to "submitted" status, to indicate that a workflow is in progress for that proposed change. Control then proceeds from block 247 back to block 241.

When it is determined that all entries in the scenario attributes table which correspond to the current scenario have been processed, control proceeds from block 241 to block 248, where the system publishes the event specified in the scenario table in order to initiate a workflow. In particular, the entries in the WORKFLOW OBJECT and EVENT columns of the scenario table are used in an interaction with the workflow engine 43 (FIG. 1) in order to initiate a workflow. Then, still in block 248, the system displays a message indicating the workflow has been initiated. From this point on, the workflow is handled by the workflow engine 43, the details which are not part of the present invention and are therefore not discussed here in detail. The workflow engine 43 will effect an appropriate routing of the workflow in order to obtain the necessary approvals, and will then change the database 36 so as to implement the proposed changes that have been approved.

In FIG. 8, control proceeds from each of blocks 238 and 248 to block 249, where the system clears the ACTIVATE ALL flag. Control then proceeds from block 249 back to block 208. When it is determined at block 208 that the system has processed each scenario/row of the scenario table for which the FOUND flag is set, control proceeds from block 208 to block 221, and a return is made to the calling routine.

In the screens of FIGS. 4 and 7, each attribute that can be changed has a respective CREATE PLANNED button. Alternatively, however, where a given attribute currently has no associated information, for example where a position currently does not have any person assigned to it, the CREATE PLANNED button for that attribute can be omitted. If the user begins entering information for that attribute, the system can automatically treat the entry of information as a "create planned" event.

The present invention provides a number of technical advantages. One such technical advantage is that a user can save one or more proposed changes to a database of information without submitting the changes for implementation, and that a plurality of the saved proposed changes which are related to each other can subsequently be simultaneously processed for implementation. A further advantage results from the use of a table structure to facilitate the processing and implementation of proposed changes, the table structure being accessed to determine which saved proposed changes are related to each other. A further advantage results from use of the table structure to determine when a workflow is required. Still another advantage results from use of the table structure to determine which workflow to initiate when a workflow is required. In the specific context of SAP software, the invention provides the advantage of permitting a workflow to be initiated or triggered from within the personnel development module.

TABLE 1

SCENARIO TABLE

| OBJECT | SCENARIO | WORK FLOW OBJECT | EVENT | MODE | OBLIG | LTEXT | MGR DOMAIN | FOUND FLAG |
|---|---|---|---|---|---|---|---|---|
| O | DEFAULT | | | OA | | Default for organization | | |
| O | INSE | | | OA | X | Create organization | | |
| S | A008 | PD_1001 | SUBMITTED_TRANSFER | SH | | Holder of a position | X | |
| S | A908 | PD_1001 | SUBMITTED_TDY_REQ | SH | | TDY assignment | X | |
| S | DEFAULT | | | SA | | Default for position | | |
| S | MOVE_C | PD_1001 | SUBMITTEDS | SA | | Job for position change | | |
| S | MOVE_EXT | ZH_PD_1010 | SUBMITTED | SA | | Source external change | | |

TABLE 2

SCENARIO ATTRIBUTES TABLE

| OTYPE | SCENARIO | SEQUENCE | DATA IDENTIFIER | SUBTY | STATUS | RELATED OBJECT | TRIGGER | ACTIVATE |
|---|---|---|---|---|---|---|---|---|
| O | DEFAULT | 1 | 1000 | | 1 | | X | |
| O | DEFAULT | 2 | 1001 | A011 | 2 | | | X |
| O | DEFAULT | 3 | 1028 | | 2 | | | X |
| O | DEFAULT | 4 | 9001 | | 2 | | | X |
| O | DEFAULT | 5 | 1001 | B012 | 2 | | | X |
| S | A008 | 1 | 1001 | A008 | 2 | | X | |
| S | A908 | 1 | 1001 | A908 | 2 | | X | |
| S | DEFAULT | 1 | 1000 | | 1 | | X | |
| S | DEFAULT | 2 | 1002 | * | 2 | | | X |
| S | DEFAULT | 3 | 9004 | | 2 | | | X |
| S | DEFAULT | 4 | 1001 | A031 | 2 | | | X |

TABLE 2-continued

SCENARIO ATTRIBUTES TABLE

| OTYPE | SCENARIO | SEQUENCE | DATA IDENTIFIER | SUBTY | STATUS | RELATED OBJECT | TRIGGER | ACTIVATE |
|---|---|---|---|---|---|---|---|---|
| S | DEFAULT | 5 | 1007 | | 2 | | | X |
| S | DEFAULT | 6 | 1011 | | 2 | | | X |
| S | DEFAULT | 7 | 9003 | | 2 | | | X |
| S | DEFAULT | 9 | 1028 | | 2 | | | X |
| S | DEFAULT | 10 | 1001 | B003 | 2 | A | | X |
| S | MOVE_C | 2 | 1001 | B007 | 2 | C | X | |
| S | MOVE_EXT | 2 | 1010 | 9005 | 2 | | X | |

Although one embodiment has been illustrated and described in detail, it will be understood that various changes, substitutions and alternations can be made therein without departing from the spirit and scope of the present invention, as defined by the following claims.

What is claimed is:

1. A method, comprising the steps of:

maintaining a database of information;

accepting from a user through a user input apparatus a proposed change to the database and a specified status therefor;

saving a proposed change when the specified status therefor is a first status, without initiating implementation thereof; and processing a proposed change by initiating implementation thereof when the specified status therefor is a second status different from the first status, said processing step including the step of initiating a workflow where the proposed change having the second status requires a workflow.

2. A method according to claim 1, wherein said processing step includes the step of promptly implementing the proposed change in the database if no workflow is required therefor.

3. A method according to claim 1, wherein said processing step includes the step, when a workflow is required, of delaying implementation of the proposed change in the database until after successful completion of the workflow.

4. A method according to claim 3, wherein said processing step includes the step of promptly implementing the proposed change in the database if no workflow is required therefor.

5. A method according to claim 1, including a predefined table structure which identifies possible changes of a first type and possible changes of a second type different from the first type, the proposed change being one of the first and second types, the table structure further having for each of the first and second types a respective indicator that can have one of first and second states, the first state indicating that a workflow is unnecessary for a proposed change of that type which affects only a domain of the user proposing the change; and wherein said processing step includes the step of initiating implementation of the proposed change without a workflow if the corresponding indicator has the first state and if the proposed change affects only the domain of the user proposing that change.

6. A method according to claim 1, including the step of responding to execution of said processing step for a first proposed change by searching for a second proposed change which has been saved with the first status, and then carrying out said processing step for the second proposed change.

7. A method according to claim 6, including the step of changing the status of the second proposed change from the first status to the second status.

8. A method according to claim 6, wherein the first proposed change is a first type of change, and wherein said searching step includes the step of ignoring saved proposed changes which are of a second type different from the first type.

9. A method according to claim 8, including a predefined table structure having a portion which identifies possible changes of the first type and possible changes of the second type, said searching step including the step of accessing the table structure.

10. A method according to claim 8, including a predefined table structure having a first portion which identifies possible changes of the first type and possible changes of the second type, and having a second portion which identifies when a workflow is required for each of the possible changes, said searching step including the step of accessing the table structure.

11. A method according to claim 10, wherein the first portion of the table structure identifies for each of the possible changes a respective workflow to be initiated when the second portion thereof indicates that a workflow is required.

12. A method according to claim 10, wherein the table structure includes first and second tables which are separate, and which respectively have therein the first and second portions of the table structure.

13. A method according to claim 1, including the step of permitting a user to switch a saved proposed change from the first status to the second status, and thereafter carrying out said processing step for the saved proposed change.

14. A method according to claim 1, including first and second types of proposed changes; and wherein said processing step includes the step of responding to a first proposed change which has the second status by aborting said processing step unless one of a first criterion and a second criterion is satisfied, the first criterion being that the first proposed change is of the first type, and the second criterion being that there is a second proposed change which has been saved with the first status and is of the first type.

15. A method according to claim 1, wherein said step of processing a proposed change includes, prior to said step of initiating a workflow when the proposed change has the second status and requires a workflow, the steps of determining whether data needed to carry out the workflow is in said database, and inhibiting said step of initiating a workflow in response to a determination that data needed for the workflow is absent from said database.

\* \* \* \* \*